United States Patent
Kim et al.

(10) Patent No.: US 9,942,508 B2
(45) Date of Patent: Apr. 10, 2018

(54) REMOTE CONTROLLER SETTING METHOD USING EDID

(71) Applicant: REMOTE SOLUTION CO., LTD., Kimcheon (KR)

(72) Inventors: Jin Kyu Kim, Gumi (KR); Ho Soo Moon, Gunpo (KR)

(73) Assignee: REMOTE SOLUTION CO., LTD., Kimcheon (KR)

( * ) Notice: Subject to any disclaimer, the term of this patent is extended or adjusted under 35 U.S.C. 154(b) by 0 days.

(21) Appl. No.: 15/358,680

(22) Filed: Nov. 22, 2016

(65) Prior Publication Data

US 2018/0027204 A1  Jan. 25, 2018

(30) Foreign Application Priority Data

Jul. 19, 2016 (KR) .................... 10-2016-0091077

(51) Int. Cl.
*H04N 5/44* (2011.01)
*H04N 7/10* (2006.01)

(52) U.S. Cl.
CPC ............ *H04N 5/4403* (2013.01); *H04N 7/10* (2013.01); *G08C 2201/92* (2013.01); *H04N 2005/4407* (2013.01)

(58) Field of Classification Search
CPC .............................. H04N 5/4403; H04N 7/10
See application file for complete search history.

(56) References Cited

U.S. PATENT DOCUMENTS

| | | | | |
|---|---|---|---|---|
| 2008/0088495 A1* | 4/2008 | Kawakita | ............... | G08C 19/28 341/176 |
| 2009/0327474 A1* | 12/2009 | Ida | ...................... | H04L 12/2809 709/223 |
| 2010/0118193 A1* | 5/2010 | Boyden | .................. | G09G 5/006 348/554 |
| 2010/0253856 A1* | 10/2010 | Sato | ................. | G11B 20/00007 348/723 |
| 2011/0157479 A1* | 6/2011 | Higuchi | .............. | H04L 12/4625 348/734 |
| 2012/0249890 A1* | 10/2012 | Chardon | .................. | H04N 5/44 348/734 |
| 2014/0359675 A1* | 12/2014 | Mank | .................. | H04L 12/2805 725/80 |
| 2017/0034563 A1* | 2/2017 | Fischer | ................ | H04N 21/251 |

FOREIGN PATENT DOCUMENTS

| | | |
|---|---|---|
| KR | 10-0546674 A | 1/2006 |
| KR | 10-1231833 A | 2/2013 |
| KR | 10-1247634 A | 4/2013 |

\* cited by examiner

*Primary Examiner* — Brian P Yenke
*Assistant Examiner* — Sean N. Haiem
(74) *Attorney, Agent, or Firm* — STIP Law Group, LLC

(57) ABSTRACT

A remote controller setting method using display identification data (EDID) includes transmitting, by a TV, EDID information to a set-top box, when the set-top box is connected to the TV through a high definition multimedia interface cable, and analyzing, by the set-top box, the EDID information to grasp a manufacturer's name of the TV and transmitting, to a remote controller, the manufacturer's name of the TV or infrared (IR) code information corresponding to the TV manufacturer to allow the remote controller to remotely control the TV (5).

2 Claims, 5 Drawing Sheets

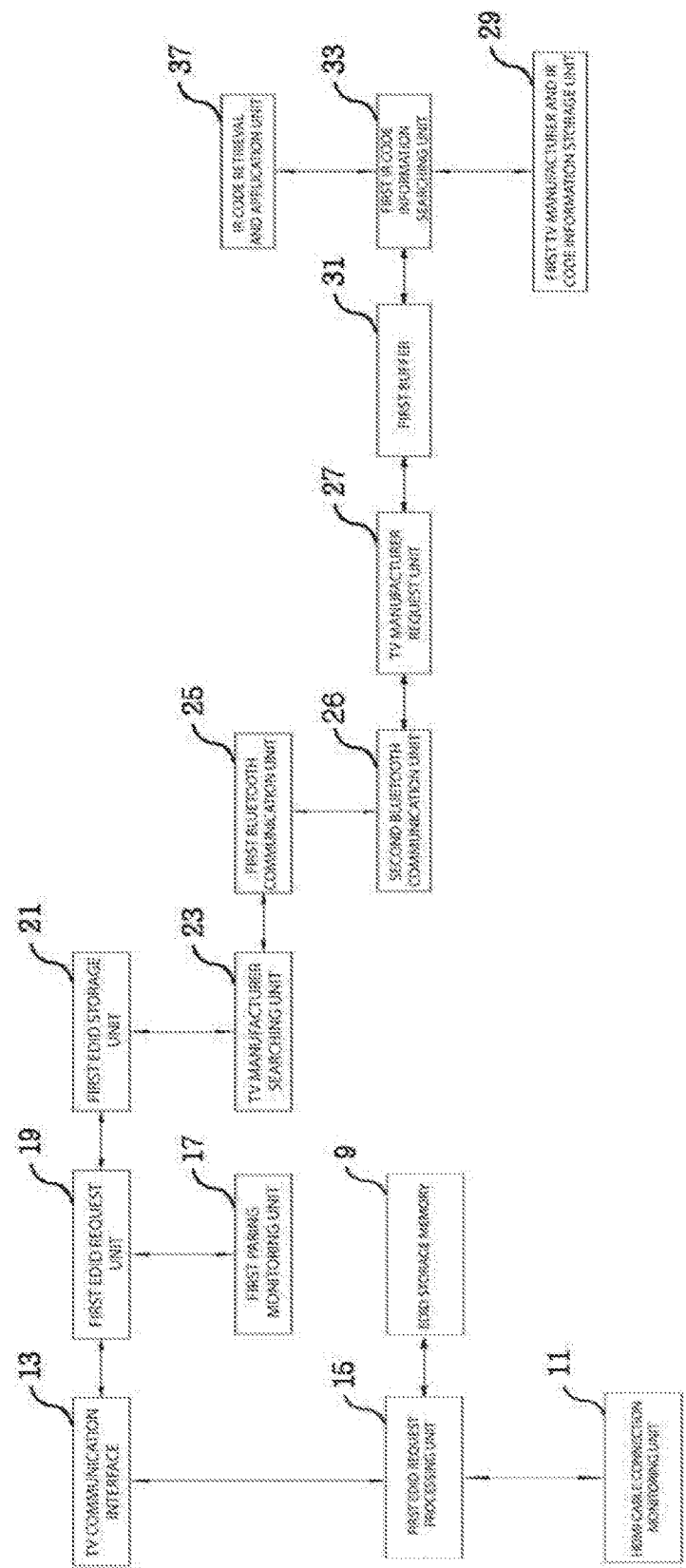

REMOTE CONTROLLER SETTING METHOD USING EDID

CROSS-REFERENCE TO RELATED APPLICATION

This application claims priority to Korean Patent Application No. 10-2016-0091077 filed on Jul. 19, 2016 and all the benefits accruing therefrom under 35 U.S.C. § 119, the contents of which are incorporated by reference in their entirety.

BACKGROUND

The present disclosure relates to a remote controller setting method using extended display identification data (EDID) and in particular, to a remote controller setting method using EDID enabling a set-top box, which obtains EDID from a TV to pass, to the remote controller, information about a manufacturer of the TV or infrared (IR) code information corresponding to the TV manufacturer to allow one remote controller to remotely control many TVs of which manufacturers are different.

Typically, an electronic product has a unique remote controller for a remote control and a control command of the remote controller is delivered to a control target device through an IR or RF signal.

Typically, a remote controller is provided for each electronic product and when manufacturers are different or devices of the same manufacturer are different, the remote controllers are not compatible.

When there are several electronic products in a home, remote controllers are necessary as many as the number of the electronic products. Therefore, it is very complicated and inconvenient to select a proper remote controller as necessary and perform a function control.

In order to resolve such inconvenience, each company provides an integrated remote controller which enables a single remote controller to control its own products, but it is still not possible to control products of other manufacturers.

In addition, there is a programmable universal remote controller that copies control signals of several remote controllers, but it is cumbersome to individually program each button thereof.

In particular, an existing remote controller does not properly correspond to a product having a new function or a new product requiring an unusual user interface and has limitations that immediacy and convenience are greatly lowered at the time of use.

In addition, when a device being currently remotely controlled is changed to another device, it is cumbersome to work with the existing remote controller which requires to check a manual of the other device, to find a unique code from the manual, and to input again the found unique code into the remote controller.

On the other hand, as a prior art of the present disclosure, Korean Patent No. 10-0546674, "Method for realizing integrated remote controller" was filed and patented. The method for realizing an integrated remote controller enables a plurality of electronic products to be controlled with one remote controller, the method including: receiving, from an electronic product, remote controller control information (including product code information, key code data, and key arrangement state information); storing the received remote controller control information, changing a current key codes and key arrangement diagram on the basis of the stored remote controller control information according to a user's request and displaying the changed key code and key arrangement diagram in a touch screen manner; and sending a key code corresponding to a user' key input through the key arrangement diagram to remotely control the electronic product.

CITATIONS

Patent Literatures (Patent Literature 001) Korean patent No, 10-0546674 (Jan. 26, 2006)
(Patent Literature 002) Korean patent No, 10-1231833 (Feb. 8, 2013)
(Patent Literature 003) Korean patent No, 10-1247634 (Apr. 1, 2013)

SUMMARY

The present disclosure provides a remote controller setting method using extended display identification data (EDID) enabling a remote controller to remotely control a TV connected to a set-top box without changing a setting of a remote controller, when a high definition multimedia interface (HDMI) cable through which the TV exchanges data with the set-top box is disconnected from the TV or the TV connected to the set-top box is changed.

The present disclosure also provides a remoter controller setting method using EDID in which it is not necessary to carry or install a separate remote controller for each TV according to each manufacturer by enabling one remote controller to control, in an integrated manner, a plurality of TVs of which manufacturers are different.

The present disclosure also provides a remote controller setting method using EDID in which it is not necessary to input a unique code of a TV manufactured by a specific manufacturer using a remote controller key, when a TV remotely controlled by a current remote controller is changed to a TV of another manufacturer In accordance with an exemplary embodiment of the present invention, a remote controller setting method using display identification data (EDID) includes: transmitting, by a TV, EDID information to a set-top box, when the set-top box is connected to the TV through a high definition multimedia interface cable; and analyzing, by the set-top box, the EDID information to grasp a manufacturer's name of the TV and transmitting, to a remote controller, the manufacturer's name of the TV or infrared (IR) code information corresponding to the TV manufacturer to allow the remote controller to remotely control the TV 5.

BRIEF DESCRIPTION OF THE DRAWINGS

Exemplary embodiments can be understood in more detail from the following description taken in conjunction with the accompanying drawings, in which:

FIG. 8 illustrates a configuration element of a tv, set-top box, and a remote controller in a first embodiment of the present disclosure.

DETAILED DESCRIPTION OF EMBODIMENTS

Hereinafter, embodiments of the present disclosure will be described in detail with reference to the accompanying drawings.

Figure 1:
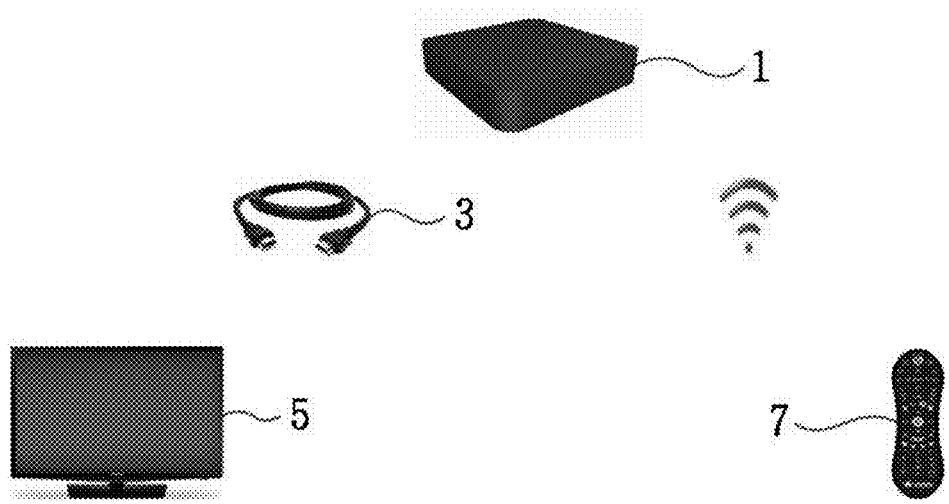
FIG. 1 is a conceptual diagram of an embodiment of the present disclosure.
Figure 2:
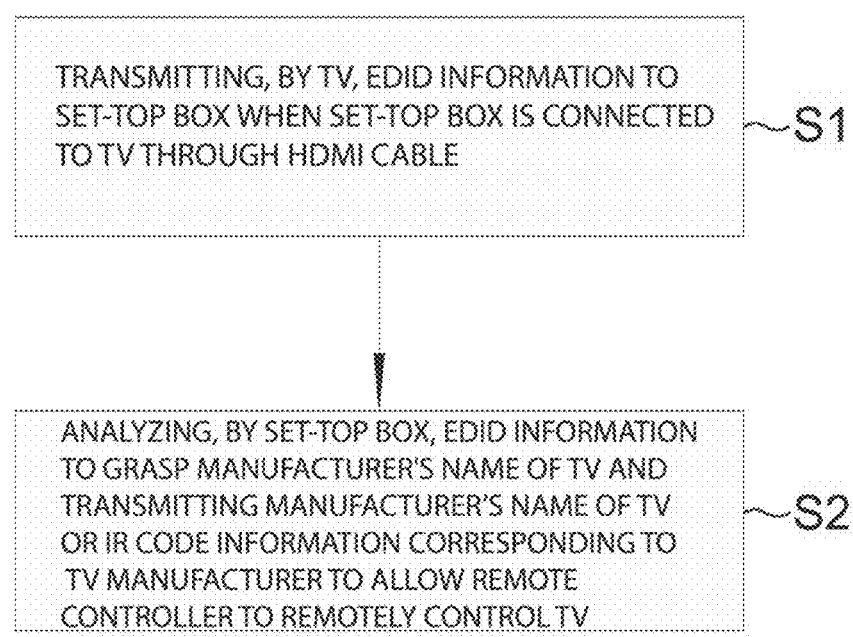
FIG. 2 is a control flowchart of an embodiment of the present disclosure.

A remote controller setting method using extended display identification data (EDID) according to an embodiment of the present disclosure includes, as illustrated in FIGS. 1 and 2, transmitting, by a TV 5, EDID information to a set-top box 1, when the set-top box 1 is connected to the TV 5 through a high definition multimedia interface (HDMI) cable 3 (operation S1); and analyzing, by the set-top box 1, the EDID information to grasp a manufacturer's name of the TV 5 and transmitting, to a remote controller 7, the manufacturers' name of the TV 5 or infrared (IR) code information corresponding to the manufacturer of the TV 5 to allow the remote controller 7 to remotely control the TV 5 (operation S2).

The EDID information has a video electronics standards association (VESA) standard data format including basic information for a monitor and includes capability of the monitor, information about the manufacturer, a maximum image size, color characteristics, factory preset timing, frequency range limitation, and character sequence of a monitor's name and a serial number.

For reference, the IR code information is a unique code system for remotely controlling the TV 5 for each manufacturer.

In the analyzing of the EDID information to grasp a manufacturer's name of the TV 5 and the transmitting of the manufacturers' name of the TV 5 or IR code information corresponding to the manufacturer of the TV 5 to allow the remote controller 7 to remotely control the TV 5, a first embodiment in which the set-top box 1 transmits the manufacturer's name of the TV 5 to the remote controller 7 is performed such that the IR code information according to the manufacturer of the TV 5 is stored in the remote controller 7 and the remote controller 7 applies, to the remote controller 7, the IR code information corresponding to the manufacturer of the TV 5, which has been transmitted from the set-top box 1, to remotely control the TV 5.

The remote controller 7 is a Bluetooth remote controller 7 and the Bluetooth remote controller 7 may be divided into a classic Bluetooth remote controller and a Bluetooth Low Energy (BLE) remote controller.

In the case of the BLE remote controller, the remote controller 7 receives the manufactures' name of the TV 5 or the IR code information from the set-top box 1 at the time of being paired with the set-top box 1.

On the contrary, in the case of the classic Bluetooth remote controller, the set-top box 1 transmits the manufactures' name of the TV 5 or the IR code information to the remote controller 7 at the time of receiving an event signal from the remote controller 7.

Figure 3:
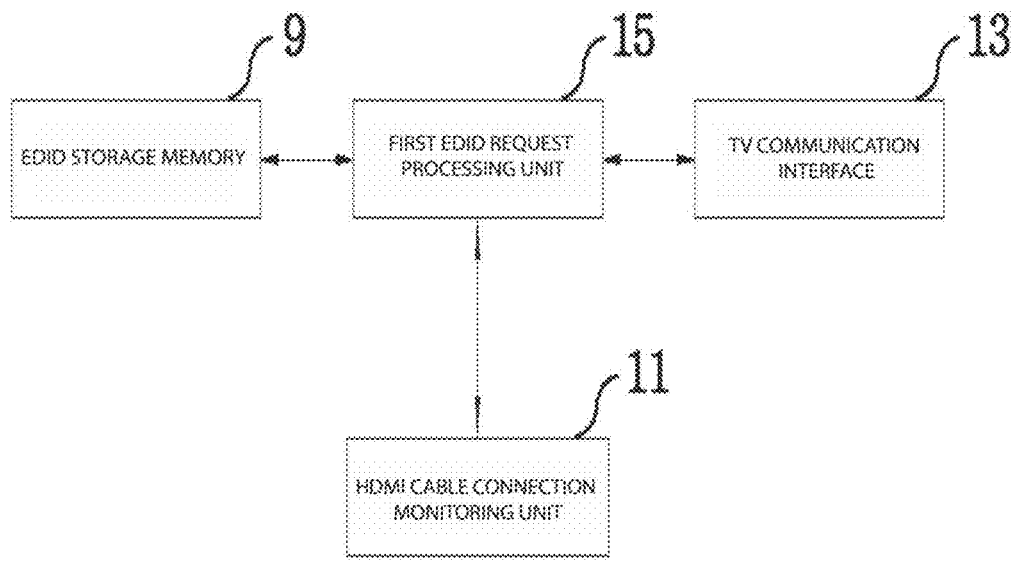
FIG. 3 illustrates a configuration element of a TV in a first embodiment of the present disclosure.

In the first embodiment in which the set-top box 1 transmits the manufacturer's name of the TV 5 to the remote controller 7, as illustrated in FIG. 3, the TV 5 includes an EDID storage memory 9 for storing EDID of the TV 5, a HDMI cable connection monitoring unit 11 for monitoring whether the HDMI cable 3 is disconnected from the TV 5, and a first EDID request processing unit 15 for retrieving the EDID stored in the EDID storage memory 9 and transmitting the retrieved EDID to the set-top box 1 through a TV communication interface 13, when the EDID information is requested from the set-top box 1 through the TV communication interface 13 or it is detected that the HDMI cable 3 is disconnected from the TV 5 through the HDMI cable connection monitoring unit 11.

Figure 4:
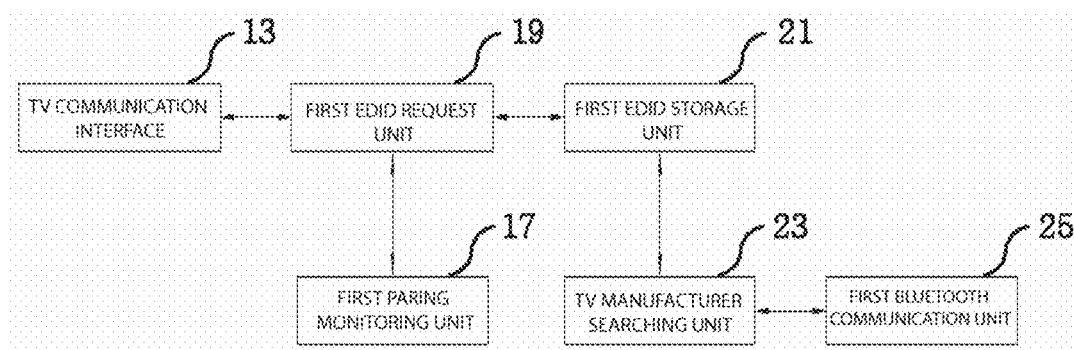
FIG. 4 illustrates a configuration element of a set-top box in a first embodiment of the present disclosure.

In addition, in the first embodiment in which the set-top box 1 transmits the manufacturer's name of the TV 5 to the remote controller 7, as illustrated in FIG. 4, the set-top box 1 includes a first paring monitoring unit 17 for monitoring whether to be paired with the remote controller 7, a first EDID request unit 19 for requesting the EDID from the TV 5, when it is determined to be paired with the remote controller 7 through the first pairing monitoring unit 17 or when a Bluetooth connection event or a key data transmission event is input from the remote controller 7 through Bluetooth communication, a TV communication interface 13 for delivering the EDID having been transmitted from the TV 5 to the set-top box 1 and transmitting, to the TV 5, an EDID request signal having been transmitted from the set-top box 1, a first EDID storage unit 21 for storing EDID information having been transmitted from the TV communication interface 13, a TV manufacturer searching unit 23 for searching the EDID stored in the first EDID storage unit 21 for a manufacturer of the TV 5, and a first Bluetooth communication unit 25 for transmitting the manufacturer of the TV 5 found by the TV manufacturer searching unit 23 to the remote controller 7 through Bluetooth communication.

Figure 5:
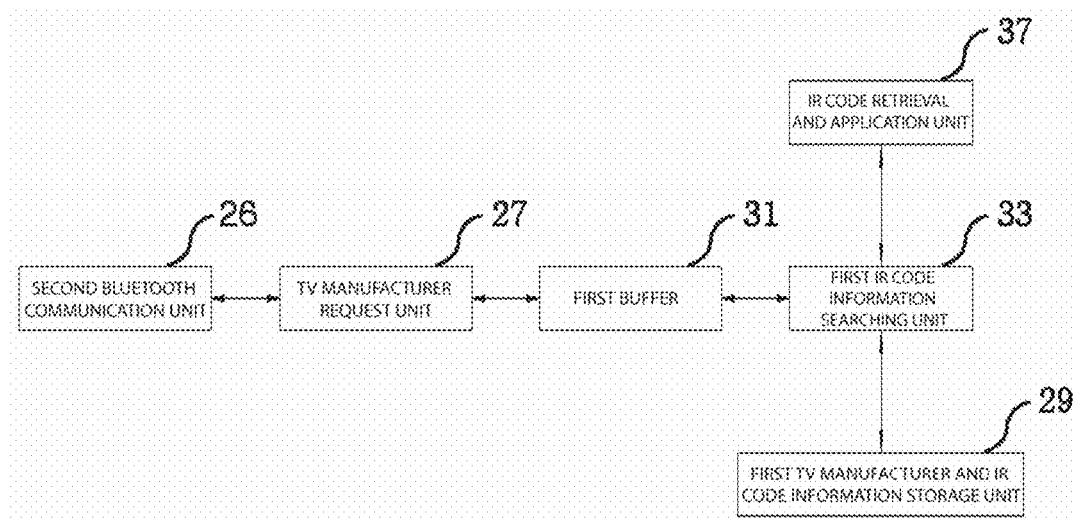
FIG. 5 illustrates a configuration element of a remote controller in a first embodiment of the present disclosure.

In addition, in the first embodiment in which the set-top box 1 transmits the manufacturer's name of the TV 5 to the remote controller 7, as illustrated in FIG. 5, the remote controller 7 includes a TV manufacturer request unit 27 for requesting paring from the set-top box 1 in order to receive the manufacturer of the TV 5 from the set-top box 1 or transmitting, to the set-top box 1, a Bluetooth connection event signal or a key data transmission event signal through Bluetooth communication, a second Bluetooth communication unit 26 for receiving the manufacturer of the TV 5 from the set-tip box 1 through the Bluetooth communication with the set-top box 1, requesting paring from the set-top box 1, or transmitting, to the set-top box 1, the Bluetooth connection event signal or the key data transmission event signal, a first TV manufacturer and IR code information storage unit 29 for storing IR code information according to each manufacturer of the TV 5, a first buffer 31 for storing the manufacturer of the TV 5 delivered from the set-top box 1 through the second Bluetooth communication unit 26, a first IR code information searching unit 33 for comparing the manufacturer of the TV 5, which is stored in the first buffer 31, with one stored in the first TV manufacturer and IR code information storage unit 29 to search for the IR code information corresponding to the manufacturer of the TV 5, which is stored in the first buffer 31, and an IR code retrieval and application unit 37 for applying, to the remote controller 7, the IR code information found by the first IR code information searching unit 33 to allow the remote controller 7 to remotely control the TV 5 connected to the set-top box 1.

In the analyzing of the EDID information to grasp a manufacturer's name of the TV 5 and the transmitting of the manufacturers' name of the TV 5 or IR code information corresponding to the manufacturer of the TV 5 to allow the remote controller 7 to remotely control the TV 5, a second embodiment in which the set-top box 1 transmits the IR code information to the remote controller 7 is performed in a state where there is no IR code information according to each manufacturer of the TV 5 in the remote controller 7. The set-top box 1 grasps the manufacturer of the TV 5 through the EDID having transmitted from the TV 5 and then transmits, to the remote controller 7, the IR code information corresponding to the specific manufacturer of the TV 5.

In the second embodiment in which the set-top box 1 transmits the IR code information 5 to the remote controller 7, as illustrated in FIG. 3, the TV 5 includes the EDID storage memory 9 for storing EDID of the TV 5, the HDMI cable connection monitoring unit 11 for monitoring whether the HDMI cable 3 is disconnected from the TV 5, and the first EDID request processing unit 15 for retrieving the EDID stored in the EDID storage memory 9 and transmitting the retrieved EDID to the set-top box 1 through the TV communication interface 13, when the EDID information is requested from the set-top box 1 through the TV communication interface 13 or disconnection of the HDMI cable 3 from the TV 5 is detected through the HDMI cable connection monitoring unit 11.

Figure 6:
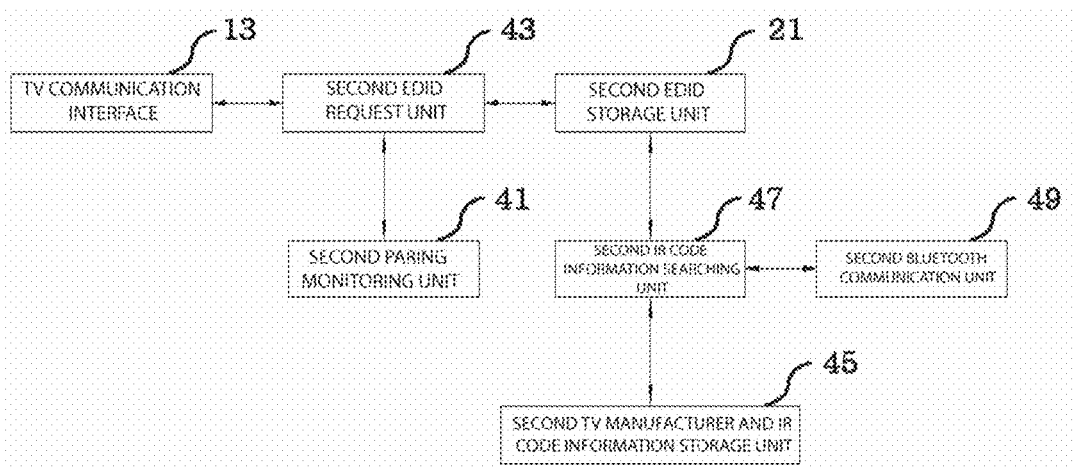
FIG. 6 illustrates a configuration element of a set-top box in a second embodiment of the present disclosure.

In the second embodiment in which the set-top box 1 transmits the IR code information 5 to the remote controller 7, as illustrated in FIG. 6, the set-top box 1 includes a second paring monitoring unit 41 for monitoring of whether to be paired with the remote controller 7, a second EDID request unit 43 for requesting EDID from the TV 5 when it is determined that the remote controller 7 is paired through the second paring monitoring unit 41 or a Bluetooth connection event or a key data transmission event is input from the remote controller 7 through Bluetooth communication, a TV communication interface 13 for delivering, to the set-top box 1, the EDID having been transmitted from the TV 5 and transmitting, to the TV 5, an EDID request signal having been transmitted from the set-top box 1, a second EDID storage unit 21 for storing EDID information having been transmitted from the TV communication interface 13, a second TV manufacturer and IR code information storage unit 45 for storing IR code information according to each manufacturer of the TV 5, a second IR code information searching unit 47 for extracting the manufacturer of the TV 5 from the EDID stored in the second EDID storage unit 21, comparing the extracted manufacturer of the TV 5 with one stored in the second TV manufacturer and IR code information storage unit 45 to select IR code information for remotely controlling the TV 5 connected to the set-top box 1, and a second Bluetooth communication unit 49 for transmitting, to the remote controller 7, the IR code information selected by the second IR code information searching unit 47 through the Bluetooth communication.

Figure 7:
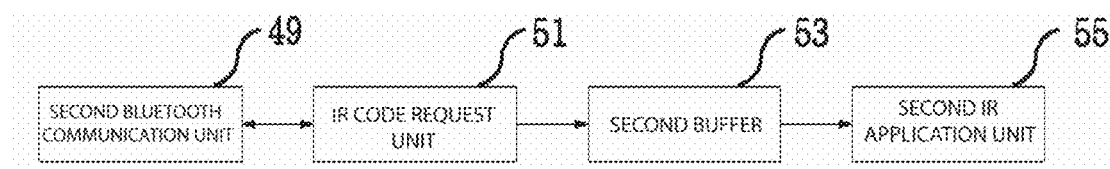
FIG. 7 illustrates a configuration element of a remote controller in a second embodiment of the present disclosure.

In the second embodiment in which the set-top box 1 transmits the IR code information 5 to the remote controller 7, as illustrated in FIG. 7, the remote controller 7 includes an IR code request unit 51 for requesting paring from the set-top box 1 in order to receive the IR code information from the set-top box 1 or transmitting, to the set-top box 1, a Bluetooth connection event signal or a key data transmission event signal through Bluetooth communication, a second Bluetooth communication unit 49 for receiving the IR code information from the set-top box 1 through the Bluetooth communication with the set-top box 1, requesting pairing from the set-top box 1, or transmitting the Bluetooth connection event signal or the key data transmission event signal to the set-top box 1, a second buffer 53 for storing the IR code information having delivered from the set-top box 1 through the second Bluetooth communication unit 49, and a second IR code application unit 55 for applying, to the remote controller 7, the IR code information stored in the second buffer 53 to allow the remote controller 7 to remotely control the TV 5 connected to the set-top box 1.

In a remote controller setting method using EDID formed of these procedures according to the present disclosure, when the set-top box 1 and the TV 5 are connected through the HDMI cable 3, the EDID information is transmitted from the TV 5 to the set-top box 1.

On the other hand, the set-top box 1 stores each manufacturer's name of the TV 5 and IR code information according to each manufacturer of the TV 5 and may grasp a specific manufacturer's name of the TV 5 together with IR code information according to the specific manufacturer of the TV 5 from the received EDID.

In addition, the set-top box 1 transmits the IR code information according to the specific manufacturer of the TV 5 to the remote controller 7 and the remote controller 7 stores the received IR code information according to the specific manufacturer of the TV 5 and retrieves the same to control the TV 5 of the specific manufacturer.

Accordingly, the remote controller setting method using EDID according to the present disclosure may allow the remote controller 7 to automatically and remotely control the set-top box 1 without changing a setting of the remote controller 7, when the HDMI cable 3 through which the TV 5 and the set-top box 1 exchange data is disconnected or the TV 5 connected to the set-top box 1 is changed.

In addition, according to the present disclosure, a plurality of TVs of which manufacturers are different are enabled to be controlled with one remote controller 7, thus it is not necessary to carry or install a separate remote controller 7 for each TV according to each manufacturer.

In addition, according to the present disclosure, when a TV currently controlled by the remote controller 7 is changed to a TV of another manufacturer, it is not necessary to input a unique code of a TV manufactured by a specific manufacturer using a key of the remote controller 7.

In a remote controller setting method using EDID according to the present disclosure, when a set-top box and a TV are connected through an HDMI cable, EDID information is transmitted from the TV to the set-top box.

On the other hand, the set-top box stores each TV manufacturer's name and IR code information according to each TV manufacturer and grasps a specific TV manufacturer's name together with IR code information according to the specific TV manufacturer from the received EDID.

In addition, the set-top box transmits the IR code information according to the specific TV manufacturer to a remote controller and the remote controller stores the received IR code information according to the specific TV manufacturer and calls the same to control the TV of the specific manufacturer.

Accordingly, in the remote controller setting method using EDID according to the present disclosure, a remote controller may automatically remotely control the TV connected to the set-top box without changing a setting of the remote controller, when the HDMI cable through which the TV and the set-top box exchange data is disconnected from the TV or the TV connected to the set-top box is changed.

In addition, according to the present disclosure, a plurality of TVs of which manufacturers are different are enabled to be controlled with one remote controller, thus it is not necessary to carry or install a separate remote controller for each TV according to each manufacturer.

In addition, according to the present disclosure, when a TV currently controlled by a remote controller is changed to a TV of another manufacturer, it is not necessary to input a unique code of a TV manufactured by a specific manufacturer using a remote controller key.

Although a remote controller setting method using EDID has been described with reference to the specific embodiments, it is not limited thereto. Therefore, it will be readily understood by those skilled in the art that various modifications and changes can be made thereto without departing from the spirit and scope of the present invention defined by the appended claims.

What is claimed is:

1. A remote controller setting method using extended display identification data (EDID) comprising:
   (S1) transmitting, by a TV, EDID information to a set-top box, wherein the set-top box is connected to the TV through a high definition multimedia interface (HDMI) cable, wherein the method for the TV comprises:
   an EDID storage memory for storing the EDID of the TV,
   an HDMI cable connection monitoring unit for monitoring whether an HDMI cable is disconnected from the TV, and
   a EDID request processing unit for retrieving the EDID stored in the EDID storage memory to transmit the retrieved EDID to the set-top box through a TV communication interface, when receiving an EDID information request through the TV communication interface from the set-top box or when it is detected that the HDMI cable is disconnected from the TV through the HDMI cable connection monitoring unit; and
   (S2) analyzing, by the set-top box, the EDID information to grasp a manufacturer's name of the TV and transmitting, to a remote controller, the manufacturer's name of the TV to allow the remote controller to remotely control the TV,
   wherein, in (S2) the analyzing of the EDID information, when the set-top box transmits the manufacturer's name of the TV, since there is IR code information according to each manufacturer of the TV in the remote controller, the remote controller applies, to itself, IR code information corresponding to the manufacturer of the TV transmitted from the set-top box to remotely control the TV;
   wherein the method for the set top-box comprises:
   a pairing monitoring unit for monitoring whether to be paired with the remote controller,
   a EDID request unit for requesting the EDID from the TV, when it is determined to be paired with the remote controller through the pairing monitoring unit or when a Bluetooth connection event or a key data transmission event is input from the remote controller through Bluetooth communication,
   a TV communication interface for delivering the EDID having been transmitted from the TV to the set-top box and transmitting, to the TV, an EDID request signal having been transmitted from the set-top box,
   a EDID storage unit for storing EDID information having been transmitted from the TV communication interface,
   a TV manufacturer searching unit for searching the EDID stored in the EDID storage unit for a manufacturer of the TV, and
   a first Bluetooth communication unit for transmitting the manufacturer of the TV found by the TV manufacturer searching unit to the remote controller through Bluetooth communication; and
   wherein the method for the remote controller comprises:
   a TV manufacturer request unit for requesting pairing from the set-top box in order to receive the manufacturer of the TV from the set-top box or transmitting, to the set-top box, a Bluetooth connection event signal or a key data transmission event signal through Bluetooth communication,
   a second Bluetooth communication unit for receiving the manufacturer of the TV from the set-top box through the Bluetooth communication with the set-top box, requesting pairing from the set-top box, or transmitting, to the set-top box, the Bluetooth connection event signal or the key data transmission event signal,
   a TV manufacturer and IR code information storage unit for storing IR code information according to each manufacturer of the TV
   a buffer for storing the manufacturer of the TV delivered from the set-top box through the second Bluetooth communication unit,
   an IR code information searching unit for comparing the manufacturer of the TV, which is stored in the buffer, with one stored in the TV manufacturer and IR code information storage unit to search for the IR code information corresponding to the manufacturer of the TV, which is stored in the buffer, and
   an IR code retrieval and application unit for applying, to the remote controller, the IR code information found by the IR code information searching unit to allow the remote controller to remotely control the TV connected to the set-top box.

2. The method according to claim 1, wherein the EDID information is a video electronics standards association (VESA) standard data format that contains basic information for a monitor and includes capability of the monitor, information about the manufacturer, a maximum image size, color characteristics, factory preset timing, frequency range limitation, and character sequence of the monitor's name and a serial number.

\* \* \* \* \*